United States Patent
Kabe et al.

[11] Patent Number: 5,850,272
[45] Date of Patent: Dec. 15, 1998

[54] SMECTIC LIQUID CRYSTAL ELEMENT AND MANUFACTURING METHOD THEREOF

[75] Inventors: Masaaki Kabe; Mitsuhiro Koden, both of Kashiwa; Nobuyuki Itoh, Noda, all of Japan

[73] Assignees: Sharp Kabushiki Kaisha, Osaka, Japan; DERA, Hants, United Kingdom

[21] Appl. No.: 802,714

[22] Filed: Feb. 19, 1997

[30] Foreign Application Priority Data

Jun. 10, 1996 [JP] Japan .................................... 8-147692

[51] Int. Cl.$^6$ .......................... G02F 1/1337; G02F 1/141
[52] U.S. Cl. ............................................. 349/126; 349/134
[58] Field of Search ...................... 349/126, 134

[56] References Cited

U.S. PATENT DOCUMENTS 5,422,748  6/1995  Yamashita et al. ...................... 349/134
5,646,704  7/1997  Kodera .................................... 349/134

FOREIGN PATENT DOCUMENTS 0345009  12/1989  European Pat. Off. .
2187859  9/1987  United Kingdom .

OTHER PUBLICATIONS

Y. Hanyu, Digest of Liquid Crystal Research Institute for Young Members 43 (1994), pp. 43–46, "Alignment Control of Ferroelectric LCD".

M. Koden, Optronics, 1994, pp. 52–57, "Ferroelectric Liquid Crystal Display".

M. Koden et al., Ferroelectrnics, vol. 149 (1993), pp. 183–192, "Ferroelectric Liquid Crystal Device Using The t–$V_{MIN}$ Mode".

T. Oh–ide et al., 13th Liquid Crystal Meeting, 1987, pp. 194–195, "Effect of Rubbing Strength on the Molecular Alignment of Liquid Crystals: Cases of N and C*LCs".

H. Sakai et al., 14th Liquid Crystal Meeting, 1988, pp. 146–147, "Uniform Molecular Alignment Control of Ferroelectric Liquid Crystals".

R. Hasegawa et al., Mol. Cryst. Liq. Cryst., 1995, vol. 262, pp. 77–88, "Analysis of Rubbed Polyimide Films By Polarized Infrared Spectroscopy.".

Primary Examiner—William L. Sikes
Assistant Examiner—Julie Ngo

[57] ABSTRACT

An electrode substrate is placed on a stage heated at temperature in a range of from 50° to 200° C. in such a manner that an alignment film of the electrode substrate faces upwards. Thereafter, a rubbing treatment is applied by a roller having the rubbing cloth wound therearound by moving a stage while rubbing the surface of the alignment film by rotating the roller in a state where the electrode substrate is sufficiently heated. Here, as the alignment film is softened by the described heat treatment, the rubbing process is facilitated. This permits a uniform C2 orientation without defects to be achieved in smectic liquid crystals.

7 Claims, 8 Drawing Sheets

SMECTIC LIQUID CRYSTAL ELEMENT AND MANUFACTURING METHOD THEREOF

FIELD OF THE INVENTION

The present invention relates to a liquid crystal element adopting smectic liquid crystals and a manufacturing method thereof.

BACKGROUND OF THE INVENTION

Recently, large area screen direct vision flat panel displays, portable information terminal display, etc., adopting ferroelectric liquid crystals have been expected to be placed for their practical applications, and earnest researches and development have been made in various fields for their beneficial features of the ferroelectric liquid crystals such as short response time, memory effect, and large viewing angle, etc., and enabling a simple matrix driving method, etc.

One of the main problems to be solved when placing the ferroelectric liquid crystals into practical applications is associated with alignment. The ferroelectric liquid crystals utilize a smectic liquid crystal phase such as a smectic C phase, etc. The smectic liquid crystal phase appears at lower temperature side than the nematic liquid crystal phase which is generally adopted in the liquid crystal displays on the current market.

FIGS. 9(a) and (b) respectively show molecular alignments of the nematic liquid crystal phase and the smectic C liquid crystal phase (ferroelectric liquid crystal phase).

As shown in FIG. 9(a), in the nematic liquid crystal phase, stick-like liquid crystal molecules 51 are uniformly aligned in one direction. However, in the liquid crystal molecules 51, centers of gravity of the molecule are not arranged regularly, and thus the liquid crystal molecules 51 are not in order as a whole. In contrast, as shown in FIG. 9(b), the smectic C liquid crystal phase has a layered structure of liquid crystal moleculesy 52, and has a larger viscosity, and is more in order compared with the nematic liquid crystal phase.

In most cases, an alignment process is required for a liquid crystal element for aligning liquid crystal molecules in any state as desired. For the conventional alignment process, a rubbing method in which alignment is achieved by rubbing a substrate interface with a rubbing cloth, etc., a temperature gradient method in which a liquid crystal phase appears from a cut surface at temperature gradient utilizing an alignment control force of the cut surface of the polymer space have been adopted. From the industrial point of view, the rubbing method is the most effective method. For the nematic liquid crystal phase, a uniform alignment without defects can be achieved relatively with ease by the conventional alignment method. In contrast, it is difficult to achieve a uniform alignment without defects for the smectic liquid crystal phase.

Furthermore, in the smectic liquid crystal phase, as shown in FIG. 10, smectic liquid crystal layers 55 between electrode substrates 53 and 54 has a chevron structure which is bent at a center. The described chevron structure has both C2 orientation and C1 orientation. In the C2 orientation, a rising direction of the liquid crystal molecules 52 on an interface between the electrode substrates 53 and 54 is set to the bending direction of the smectic liquid crystal layers 55, while in the C1 orientation, the rising direction of the liquid crystal molecules 52 on the interface between the electrode substrates 53 and 54 is in an opposite direction to the bending direction of the smectic liquid crystal layers 55.

However, in the state where the described C1 orientation and the C2 orientation are mixed within one element, the display state is adversely affected by zig-zag defects, etc. For this reason, it is particularly important to control the described two orientations in the manufacturing process of the liquid crystal element.

Conventionally, for the smectic liquid crystal phase applicable to the liquid crystal element, ferroelectric liquid crystals, anti-ferroelectric liquid crystals, etc., have been considered. Especially, research and development of the ferroelectric liquid crystals have been made most aggressively for placing them into practical applications.

For example, Habu has reported with regard to the alignment of the ferroelectric liquid crystal element. That is, by increasing a pre-tilt angle to 18°, a stable C1 orientation can be obtained (Digest of Liquid Crystal Research Institute for Young Members 43(1994)). Habu also has reported that a C1-uniform (hereinafter referred to as C1U) orientation can be obtained stably by the cross-rubbing (Digest of Liquid Crystal Research Institute for Young Members 43(1994)).

However, the C1U orientation is likely to change to the C2 orientation or the C1-twisted (hereinafter referred to as C1T) orientation at low temperature, and has disadvantageous features such as a long response time of the liquid crystals as compared with the C2 orientation (Koden, Optoronics, February, 52, 1994). The respective molecular alignments of the C1U orientation, C1T orientation and C2 orientation are, for example, as shown in FIG. 11(a) through FIG. 11(c).

Koden, et al., the inventors of the present invention have reported that by adopting an alignment film which applies a pre-tilt angle of about 5°, a stable C2 orientation can be achieved (M. Koden et al., Ferroelectrics, 149, 183(1993)). However, in practice, an alignment is greatly affected by materials of the alignment film and liquid crystal material, or processing conditions, etc., and a uniform C2 orientation may not be ensured even at a pre-tilt angle of 5°.

On the other hand, the rubbing strength when adopting a rubbing method for the alignment process is an important parameter in controlling the alignment. Here, it is known that for the ferroelectric liquid crystals, the weaker is the rubbing strength, the more preferable is. For example, Ohide et al., has reported that the weaker is the rubbing strength, the wider is the cone angle on appearance, and the more bistable is (Ohide et al., reported in digest of the 13th liquid crystal meeting, 194 (1987)). Also, Sakai et al. have reported that a uniform alignment can be obtained by selecting the rubbing strength to be not more than a predetermined critical value (Sakai, Uchida, reported in digest of the 14th Liquid Crystal Meeting, 146 (1988)).

However, according to the experiments conducted by the inventors, etc., when the rubbing strength is set low, a uniform C2 orientation cannot be obtained.

On the other hand, Hasegawa et al., have reported that by adopting an alignment film which has been rubbed under an applied heat, an uniaxial alignment characteristic of the nematic liquid crystals can be improved (R. Hasegawa et al., Mol. Cryst. liq. Cryst. 262,77 (1995). In this case, an improved rubbing strength is obtained under an applied heat.

SUMMARY OF THE INVENTION

An object of the present invention is to provide a manufacturing method of a smectic liquid crystal element in which a uniform C2 orientation without defects can be achieved with ease, and to provide a smectic liquid crystal element which offers a desirable display without defects.

The above object is accomplished by a manufacturing method of a smectic liquid crystal element of the present invention, the smectic liquid crystal element being composed of a liquid crystal composition having a smectic phase sealed between a pair of electrode substrates, which is characterized by comprising the step of:

forming alignment films respectively on the pair of electrode substrates; and applying a rubbing treatment to at least one of the alignment films at temperature in a range of from 50° to 200° C.

According to the described manufacturing method, by carrying out the rubbing treatment at temperature in a range of from 50° to 200 ° C., in general, the resulting alignment film formed of the polymer is softened, thereby achieving a larger rubbing strength as compared with that obtained when carrying out a rubbing treatment at room temperature if other conditions than temperature are unchanged. As described, by carrying out a rubbing treatment at high rubbing strength, an alignment film having such alignment control force for aligning the smectic liquid crystal is in the C2 orientation can be achieved.

In the C2 orientation, the smectic layer of the liquid crystal composition is bent with respect to the normal line of the electrode substrate, and the bending direction of the smectic layer is in a rising direction of the liquid crystal molecules on an interface between the electrode substrates and the liquid crystal composition. In contrast, in the C1 orientation, the bending direction of the smectic layer is in an opposite direction to the rising direction of the liquid crystal molecules. Here, the C2 orientation has an advantageous characteristic of short response time over the C1 orientation.

The described characteristic permits a smectic liquid crystal element which offers a short response time and a desirable display state without defects to be achieved. This also permits the C2 orientation to be achieved even when adopting the alignment film material in which only C1 orientation is shown when applying thereto the rubbing treatment at room temperature. This advantageous feature offers a wider selection for the materials of the alignment films. Furthermore, by applying the rubbing treatment under an applied heat, compared with the case of applying the rubbing treatment at room temperature, the alignment film is less likely to scratch, thereby achieving an improved yield.

A smectic liquid crystal element in accordance with the present invention is characterized by including a pair of electrode substrates, alignment films being formed respectively on the pair of electrode substrates and a liquid crystal composition showing a smectic phase, which is sealed between the electrode substrates, wherein a rubbing treatment is applied to at least one of the alignment films at temperature in a range of from 50° to 200° C.

According to the described arrangement, as the rubbing treatment is applied to the alignment film at temperature in a range of from 50° to 200° C., an alignment control force for aligning the smectic liquid crystal to have the C2 orientation can be achieved. This is because, in general, the alignment film formed by a polymer is softened at high temperature, and a larger rubbing strength can be achieved compared with that achieved when carrying out the rubbing treatment at room temperature even if other conditions than temperature are unchanged, thereby achieving a smectic liquid crystal element which shows a short response time and a desirable display without defects.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

DESCRIPTION OF THE EMBODIMENTS

The following descriptions will discuss one embodiment of the present invention in reference to FIG. 1 through FIG. 8.

First, the basic structure of a smectic liquid crystal element in accordance with the present embodiment will be explained.

Figure 2:
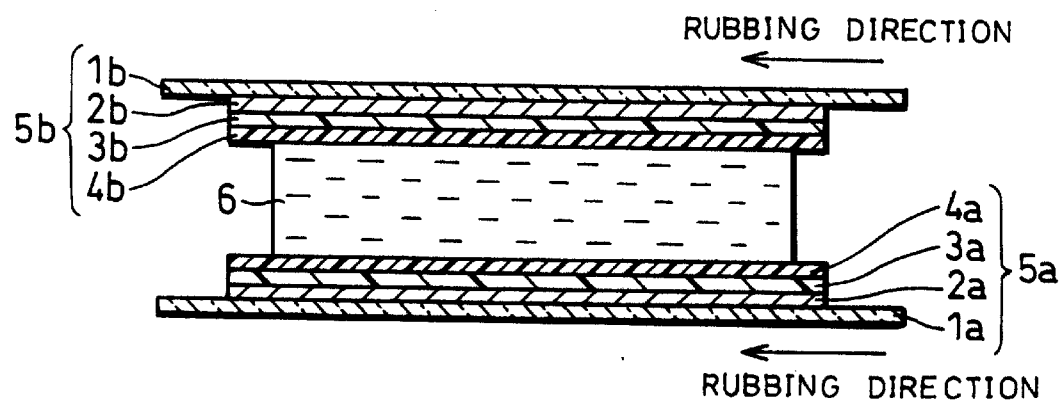
FIG. 2 is a cross-sectional view schematically showing a structure of the smectic liquid crystal element.

As shown in FIG. 2, the smectic liquid crystal element has an electrode substrate 5a and an electrode substrate 5b. The electrode substrate 5a includes an insulating substrate 1a whereon an ITO (indium tin oxide) film 2a, an insulating film 3a and an alignment film 4a are laminated in this order. The electrode substrate 5b includes an insulating substrate 1b, whereon an ITO film 2b, an insulating film 3b and an alignment film 4b are laminated in this order. A ferroelectric liquid crystal 6 is sealed between the electrode substrates 5a and 5b.

Although not shown, patterning of the ITO film 2a is performed so as to form a group of transparent electrodes that are placed parallel to one another. On the other hand, a patterning of the ITO film 2b is performed so as to form a group of transparent electrodes that are placed orthogonal to the group of transparent electrodes of the ITO film 2a. The alignment films 4a and 4b are aligned by the rubbing treatment, and the respective rubbing directions are parallel to one another as shown in FIG. 2.

Figure 1:
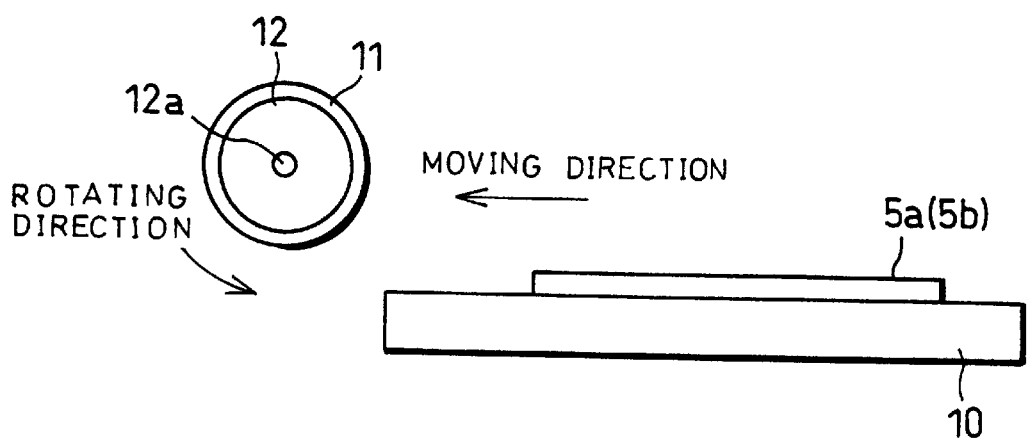
FIG. 1 is a typical depiction showing one step in a manufacturing process of a smectic liquid crystal element in accordance with one embodiment of the present invention, that is a step of rubbing an alignment film formed on an electrode substrate.

The process of aligning the alignment films 4a and 4b will be explained in reference to FIG. 1.

As shown in the figure, on a heated stage 10, electrode substrates 5a and 5b are placed so that the surface on which the alignment films 4a and 4b are formed faces upwards, and the stage 10 is moved in a moving direction shown by an arrow in the figure while rubbing the respective surfaces of the alignment films 4a and 4b with a rubbing cloth 11 wound around a roller 12 by rotating the roller 12 about the rotation shaft 12a. Here, the rubbing direction is in an opposite direction to the moving direction of the stage 10 shown by an arrow. Alternatively, it may be arranged such that the stage 10 is fixed, and the roller 12 is moved in an opposite direction to the moving direction shown by an arrow in the figure.

Additionally, the roller 12 may be heated instead of heating the stage 10, or it is also permitted to heat both the stage 10 and the roller 12. To carry out a rubbing treatment under an applied heat, other than the described method, various methods may be adopted such as a method in which a rubbing treatment is applied in a thermostat, a method in which the substrate is heated by a radiant heat from a heat source, etc.

As described, by performing the rubbing treatment under an applied heat, an increased rubbing strength can be achieved probably because the alignment films 4a and 4b made of a polymer material are softened as the temperature thereof is raised, and the rubbing treatment is facilitated. This permits the C2 orientation to be achieved even when adopting the alignment film material in which only C1 orientation is shown when applying thereto the rubbing treatment at room temperature. This advantageous feature offers a wider selection for the materials of the alignment films.

Additionally, it is effective to apply a rubbing treatment under an applied heat also in terms of preventing the alignment film from scratching by the rubbing treatment. Namely, if the rubbing strength is increased only by adjusting the rotating speed of the roller 12 or the moving speed of the stage 10, etc., it is likely that the alignment film scratches. However, when carrying out a rubbing treatment under an applied heat like the embodiment of the present invention, the alignment film is less likely to scratch.

It is also preferable that the rubbing treatment be performed at temperature in a range of from 50° to 200° C. At temperature below 50° C., respective states of the alignment films 4a and 4b hardly change, and a sufficient rubbing strength cannot be obtained. Thus, an effect cannot be obtained as desired. On the other hand, when performing the rubbing treatment at high temperature above 200° C., the alignment film is either deformed, or denatured, and a pre-tilt angle generated by the rubbing treatment may disappear by heat. From practical viewpoint, it is still more preferable that the rubbing treatment be performed at temperature in a range of from 60° to 100° C.

In order to achieve the C2 orientation, it is preferable that each of the pre-tilt angles of the alignment films 4a and 4b be in a range of from 1° to 10°. If the pre-tilt angle is larger than 10°, it is likely that the C1 orientation becomes more stable than C2 orientation. On the other hand, if the pre-tilt angle is smaller than 1°, it is likely that the C1 orientation and C2 orientation are mixed probably because if the pre-tilt angle is smaller than 1°, a difference in alignment between the C1 orientation and C2 orientation becomes small. Additionally, it is preferable that each of the pre-tilt angles of the alignment films 4a and 4b be in a range of from 3° to 8°, as a uniform C2 orientation can be achieved.

Figure 3:
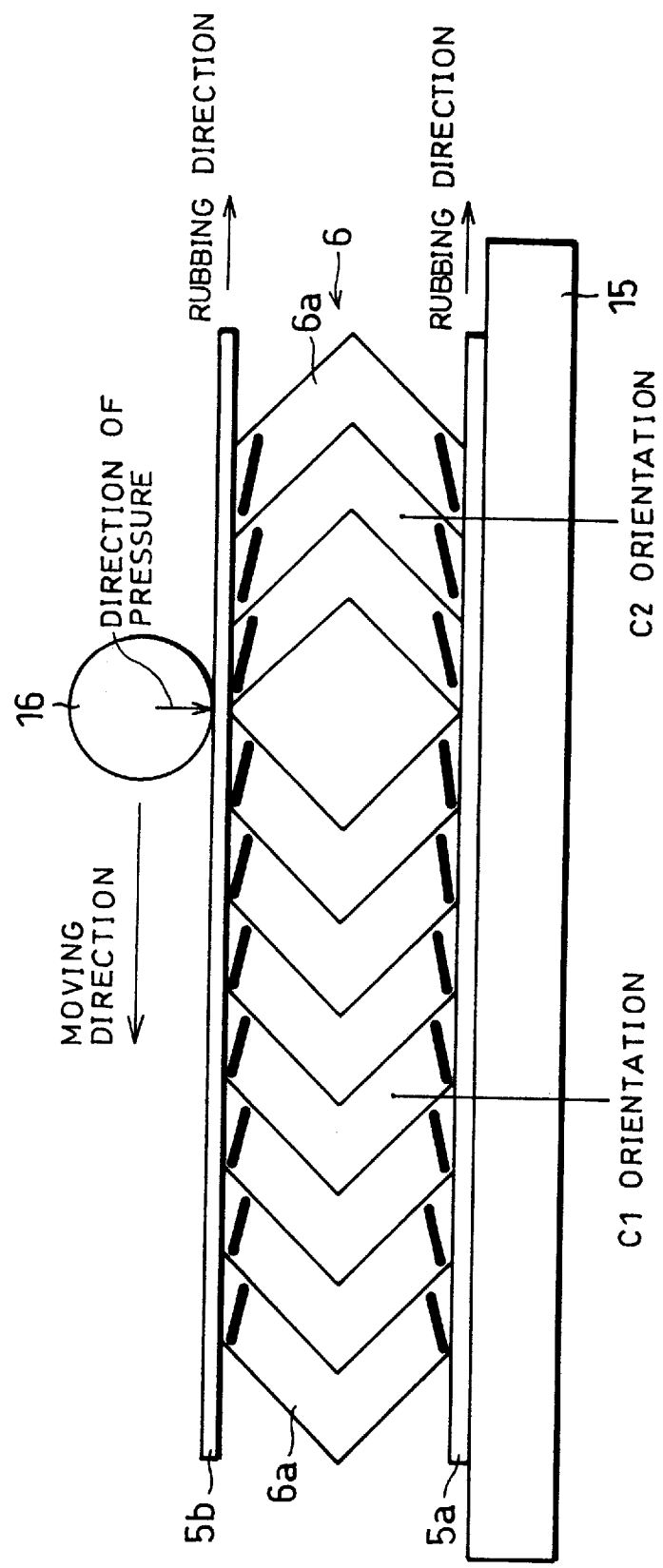
FIG. 3 is a typical depiction showing another step in the manufacturing process of the smectic liquid crystal element, that is a step of realigning a smectic layer by locally applying a pressure from outside of one of electrode substrates.
Figure 4:
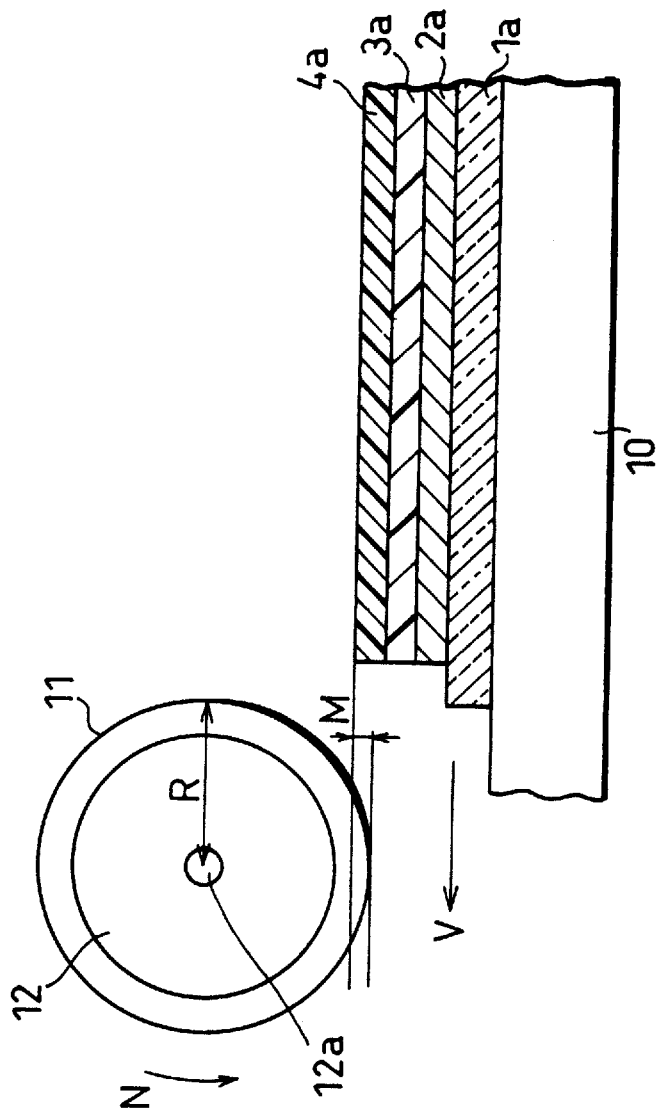
FIG. 4 is an explanatory view showing a relative position between the electrode substrate and a roller in the rubbing process shown in FIG. 1.

Additionally, after forming a liquid crystal cell by injecting ferroelectric liquid crystals 6 in a space formed by laminating the rubbed electrode substrates 5a and 5b under an applied heat, as shown in FIG. 3, by moving a stick 16 which has a circular cross-section under an applied predetermined pressure onto the surface of the substrate 5b while heating the liquid crystal cell on a heater 15, the smectic layer having the C1 orientation can be realigned into the C2 orientation.

Here, the stick 16 is moved on the entire surface of the substrate 5b in the same direction or opposite direction as or to the rubbing direction while maintaining the stick 16 in a direction perpendicular to the direction of the layer normal line of the smectic layer 6a of the ferroelectric liquid crystal 6. Especially, in the case of adopting the ferroelectric liquid crystals like the present embodiment, it is effective that the stick 16 is moved in a direction opposite to the rubbing direction shown in FIG. 3 in view of realigning the C1 orientation into the C2 orientation.

Additionally, the pressure exerted so as to press the stick 16 into the surface of the substrate 5b can be measured based on the depth of the deformed region of the substrate 5b, and it is preferable to maintain the state where the stick 16 is inserted into the substrate 5b by around 50 µm from the portion where the C2 orientation starts appearing as a result of applying pressure.

When applying a pressure using the stick 16, it is preferable that the electrode substrates 5a and 5b are heated by the heater 15 to a temperature in a range of from a phase transition temperature at which a transition in phase occurs from the smectic A (SmA) phase to the chiral smectic (SmC*) phase, to a temperature 10° C. below the phase transition temperature.

Although the explanations have been given through the case of adopting the ferroelectric liquid crystal composition, the present invention is not limited to the ferroelectric liquid crystal and it is also effective for aligning the smectic liquid crystal phase in which order parameter is higher than that in the nematic liquid crystal phase.

Next, an example of a manufacturing process of the smectic liquid crystal element shown in FIG. 2 will be explained.

First, ITO films 2a and 2b with a film thickness of 1,000 Å are respectively formed on the insulating substrates 1a and 1b, which serve as transparent electrodes, and a patterning is performed into a predetermined electrode shape. Furthermore, by applying an insulating film solution formed by AT-201 (trade name) available from Nissan Industrial Chemistry Co., Ltd., by the spin coating method, and sintering the insulating film solution at 200° C. for 90 minutes, insulating films 3a and 3b with a film thickness of 1,200 Å are formed.

Next, on the insulating films 3a and 3b, the alignment film solution obtained from SE-7792 (trade name) available from Nissan Industrial Chemistry Co., Ltd. is applied by the spin coating method, and a sintering is performed at 180° C. for 90 minutes, thereby forming alignment films 4a and 4b. According to the catalog value, the respective pre-tilt angles of the alignment films 4a and 4b are in a range of from 7° to 8°.

Thereafter, the rubbing treatment is applied to the alignment films 4a and 4b in the described manner. As shown in FIG. 1, the rubbing treatment is applied by placing the electrode substrates 5a and 5b on the stage 10 being moved at a constant rate in such a manner that the alignment films 4a and 4b face upwards, and the alignment films 4a and 4b are rubbed with the rubbing cloth 11 by rotating the roller 12.

Here, the stage 10 is heated to a predetermined temperature, and when an elapse of time of 5 minutes has passed after placing the electrode substrates 5a and 5b on the stage 10, a rubbing treatment is applied under such condition that the electrode substrates 5a and 5b are sufficiently heated. Additionally, to verify the heating effect at a later stage, the respective temperatures of the electrode substrates 5a and 5b are set to room temperature (around 26° C.), 60° C., 80° C. and 100° C., and electrode substrates 5a and 5b of four kinds are prepared respectively.

For other conditions of the rubbing treatment, (respective numeral values shown in a typical depiction of FIG. 4, etc.), are selected as follows:

Diameter R of Roller 12: 150 mm

Number of Revolutions per Minute N of Roller: 400 rpm

Moving Speed V of Stage 10: 10 mm/sec

Depth of Deformed Region M of Rubbing Cloth 11: 0.2 mm

Number of Repeated Times n of Rubbing: 3 times.

After applying the rubbing treatment to the alignment films 4a and 4b, the electrodes substrates 5a and 5b are laminated so that the rubbing direction is aligned in one direction, thereby forming a so-called a parallel rubbing liquid crystal cell. A liquid crystal material (ferroelectric liquid crystal 6) is injected under vacuum into the resulting liquid crystal cell to prepare a ferroelectric liquid crystal element. Here, the phase series of the liquid crystal material is: isotropic phase-N* (chiral nematic) phase-SmA phase-SmC* phase, and the phase transition temperature is set as follows:

crystal→SmC* phase: at or below room temperature

SmC* phase→SmA phase: 69° C.

SmA phase→N* phase: 89° C.

N* phase→isotropic phase: 101° C.

Figure 5:
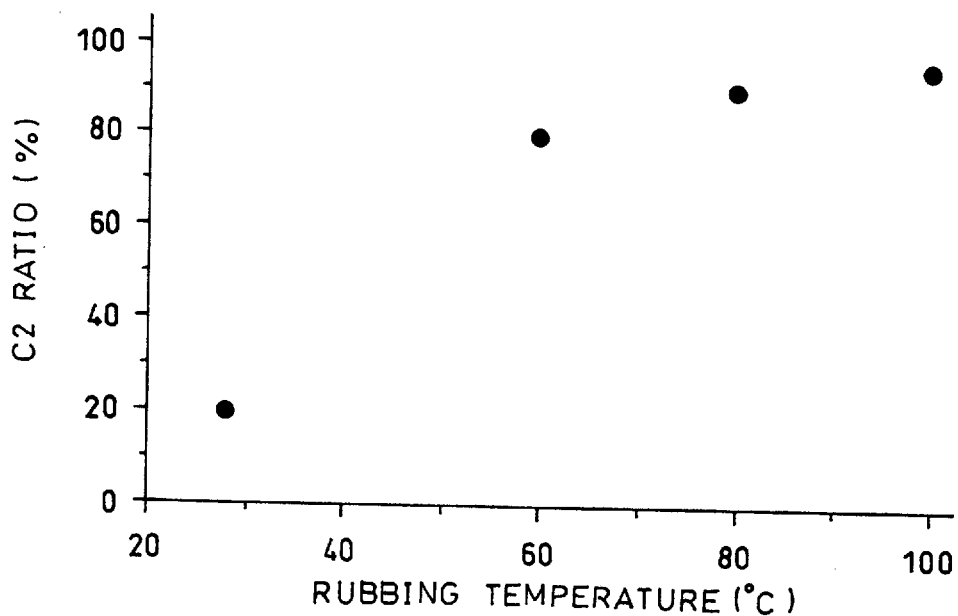
FIG. 5 is a graph showing a correlation between a rubbing temperature and a ratio of C2 orientation (C2 ratio) within a predetermined area.

In the ferroelectric liquid crystal element prepared from the electrode substrates 5a and 5b of four kinds by altering the rubbing temperature in the described manner, the correlation between the rubbing temperature and C2 ratio (a ratio of an area having C2 orientation per 1 cm$^2$) is shown in FIG. 5. As is evident from the figure, the C2 ratio in the case of performing the rubbing treatment at room temperature is low. In contrast, in the case of performing a rubbing treatment under an applied heat (to 60° C., 80° C. and 100° C.), extremely high C2 ratio can be achieved. The C2 ratio is raised with an increase in rubbing temperature. Namely, by performing a rubbing treatment under an applied heat, a still more uniform C2 orientation can be achieved, and the larger is the temperature, the more desirable is the results within the temperature range of from 60° to 100° C.

Figure 6:
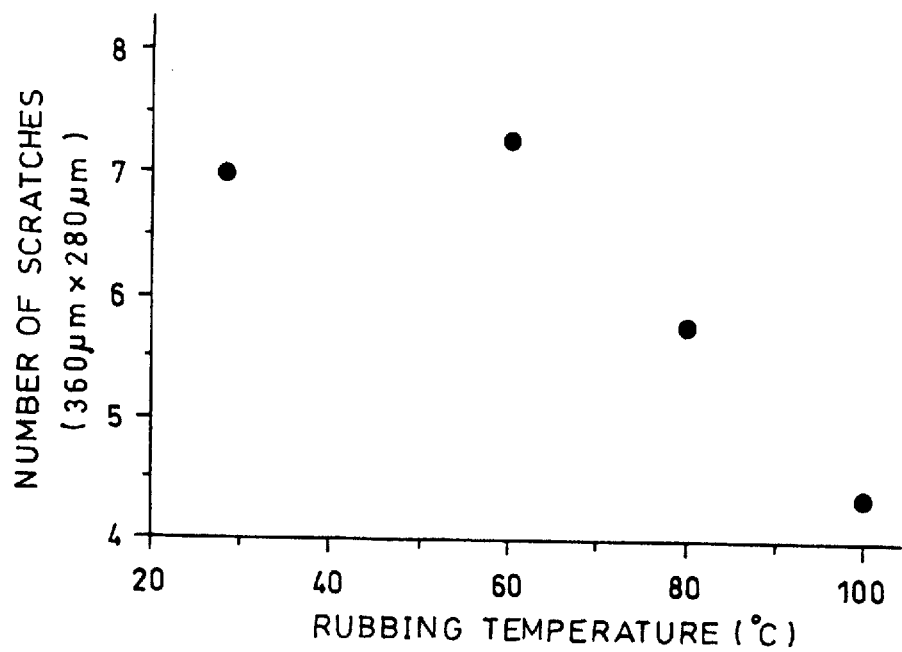
FIG. 6 is a graph showing a correlation between a rubbing temperature and a number of scratches formed within a predetermined area.

FIG. 6 shows a correlation between the rubbing temperature and scratch formed on the alignment films 4a and 4b by rubbing. In the graph, the number of scratches in an area (360 μm×280 μm) observed with a microscope with a CCD camera is shown. From the figure, when rubbing at 60° C., the number of scratches is slightly increased compared with the case of performing the rubbing treatment at room temperature. However, when rubbing at higher temperature (80° C. and 100° C.), the number of scratches is significantly reduced. Namely, in a temperature range of from 60° to 100° C., the higher is the rubbing temperature, the smaller is the number of scratches. As is evident, it is effective to carry out a rubbing treatment under an applied heat in view of reducing the number of scratches on the alignment films 4a and 4b.

Figure 7:
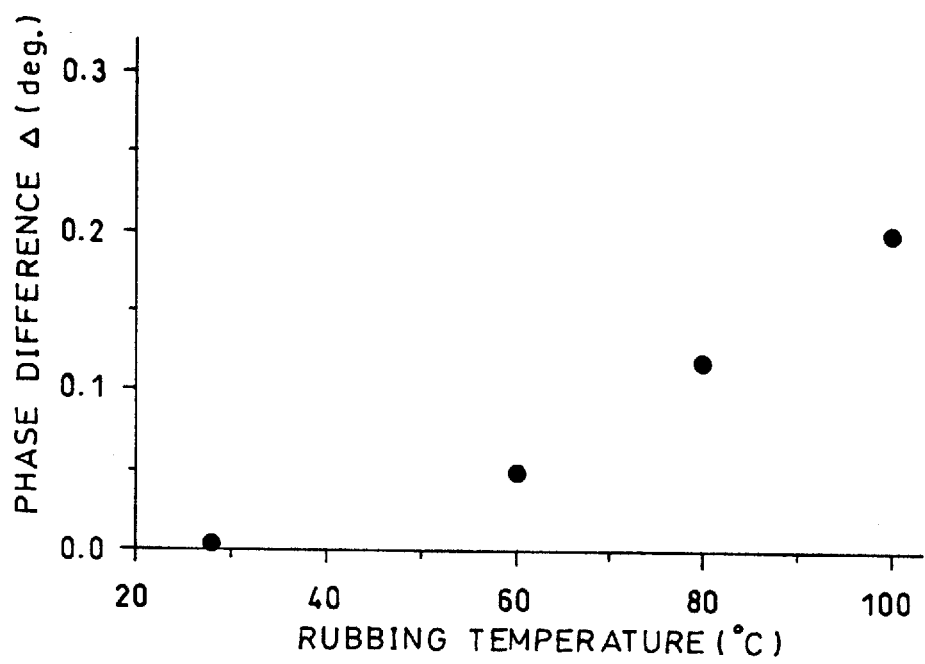
FIG. 7 is a graph showing a correlation between a rubbing temperature and a phase difference of a substrate between directions parallel to and perpendicular to the rubbing direction.

FIG. 7 is a graph showing a correlation between a rubbing temperature and a phase difference between a direction parallel to the rubbing direction and a direction perpendicular to the rubbing direction. As is evident from the figure, a phase difference when rubbing at room temperature is substantially 0°, while showing a large phase difference when applying the rubbing treatment at high temperature. Here, the higher is the temperature, the greater is a phase difference. In consideration of the results shown in FIG. 5, by performing the rubbing treatment under an applied heat, the alignment films 4a and 4b can be rubbed more strongly. As a result, it can be assumed that an improved C2 orientation can be achieved.

As described, by applying the rubbing treatment while heating the electrode substrates 5a and 5b at temperature in a range of from 60° to 100° C., a stronger rubbing treatment can be achieved, while ensuring a desirable C2 orientation, and the number of scratches formed on the alignment films 4a and 4b can be reduced. Additionally, it is confirmed that at least in a temperature range of from 60° to 100° C., the higher is the temperature, the more preferable results can be achieved.

With respect to the described ferroelectric liquid crystal element of four kinds, as shown in FIG. 3, a re-alignment process by means of the stick 16 is performed. Here, the electrode substrates 5a and 5b are heated to 65° C. by the heater 15, and the stick 16 is moved on an entire surface of the substrate 5b in the rubbing direction while maintaining the stick 16 in a direction perpendicular to the normal line of the smectic layer 6a of the ferroelectric liquid crystals 6. A force exerted so as to press the stick 16 onto the surface of the substrate 5b is set such that the stick 16 is further pushed into the substrate 5b by around 50 μm from the position at which the C2 orientation starts appearing. After completing the process, an observation is performed using a microscope. As a result, the orientation of the entire surface of the element is observed to be a uniform C2 orientation without defects.

Figure 8:
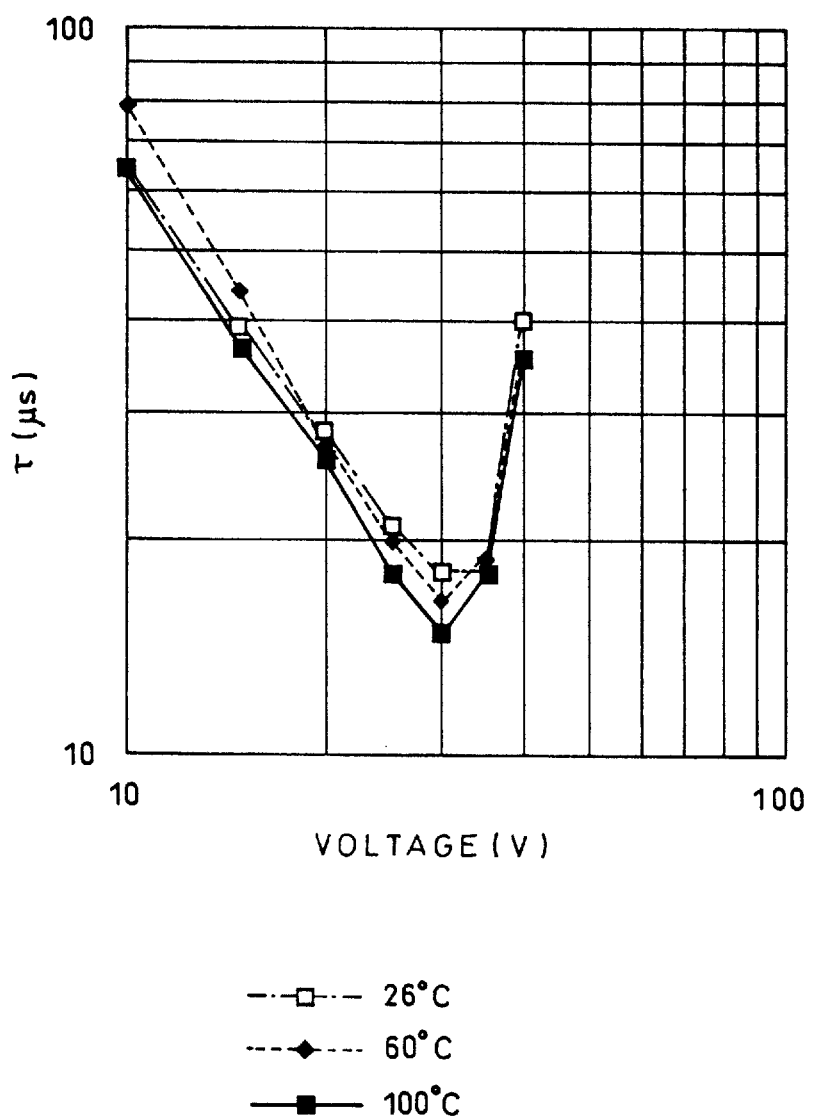
FIG. 8 is a graph showing a correlation between a width τ of a rectangular pulse and a voltage V when the liquid crystal molecules are 100% switched within the field of view of a microscope at respective rubbing temperatures.
Figure 9:
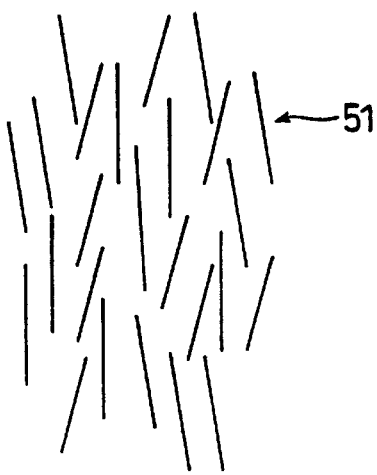
FIG. 9(a) is a typical depiction showing a molecular alignment of a nematic liquid crystal.
FIG. 9(b) is a typical depiction showing a molecular alignment of a smectic liquid crystal.
Figure 9:
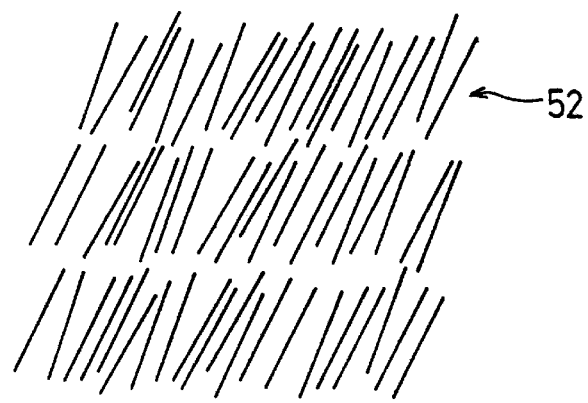
Figure 10:
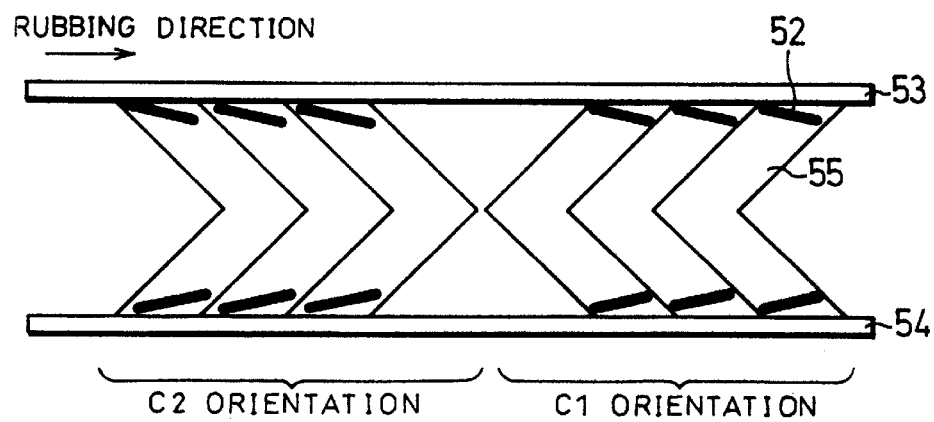
FIG. 10 is a typical depiction showing respective possible states of C1 orientation and C2 orientation of the smectic liquid crystal layer of the chevron structure.
Figure 11A:
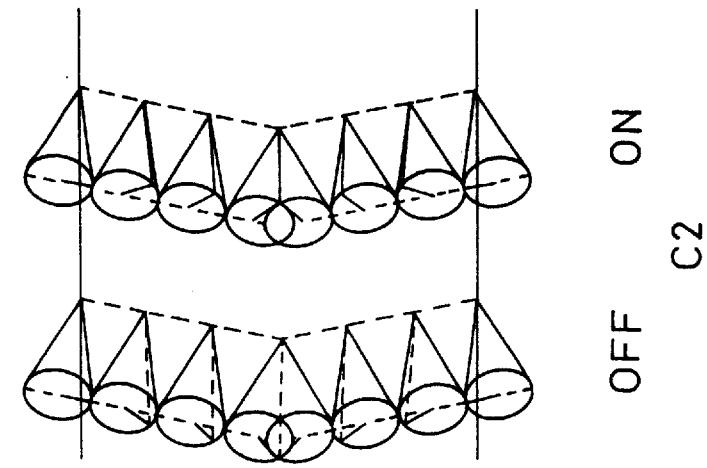
FIG. 11(a) is a typical depiction showing a molecular alignment state of a C1U orientation of the smectic liquid crystal.
Figure 11B:
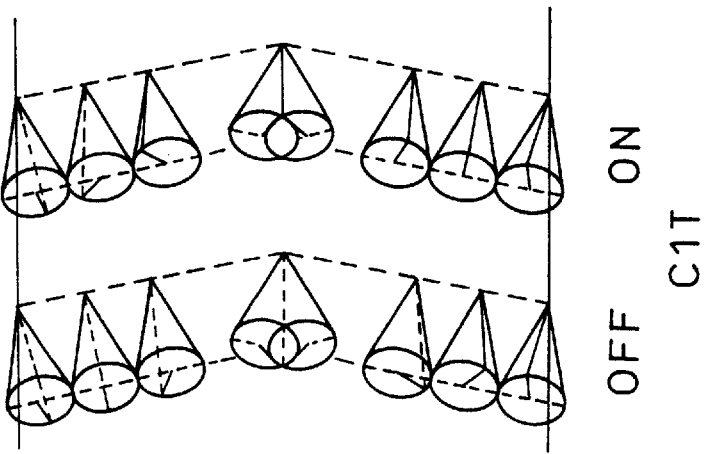
FIG. 11(b) is a typical depiction showing a molecular alignment state of a C1T orientation of the smectic liquid crystal.
Figure 11C:
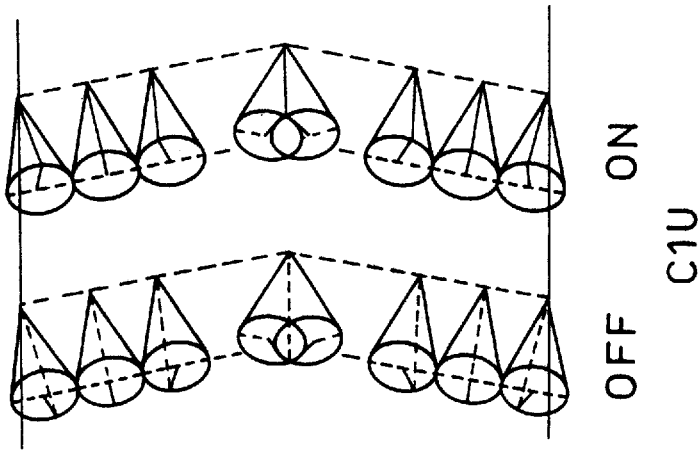
FIG. 11(c) is a typical depiction showing a molecular alignment state of a C2 orientation of a smectic liquid crystal.

In order to verify the photoelectric characteristics of the element, a rectangular wave is applied while observing it with the microscope, and a pulse width τ and the voltage V when the liquid crystal molecules are 100% switched within the field of view of the microscope are measured. The results are shown in FIG. 8. FIG. 8 shows respective τ-V characteristics of elements of three kinds, i.e., an element which is re-aligned after rubbing at room temperature, and an element which is re-aligned after performing a rubbing treatment at 60° C., and an element which is re-aligned after performing the rubbing treatment at 100° C.

As is evident from the figure, as compared with the element to which the rubbing treatment is applied at room temperature, the element to which the rubbing treatment is applied under an applied heat has a smaller minimal value of $\tau$. Further, the element to which the rubbing treatment is applied at 100° C. has a still smaller minimal value of $\tau$ as compared with the element to which the rubbing treatment is applied at 60° C. As described, by performing the rubbing treatment under an applied heat, a minimal value of $\tau$ in the $\tau$-V characteristics can be made smaller, and a shorter response time can be achieved.

Hereinafter, evaluations performed by varying the respective conditions for the rubbing treatment will be explained using comparative ferroelectric liquid crystal elements. The ferroelectric liquid crystal elements of the present embodiment feature in that the rubbing treatment is performed under an applied heat. In contrast, for all of the comparative ferroelectric liquid crystal elements, the rubbing treatment is performed at room temperature.

[Comparative Example 1]

First, ITO films 2a and 2b are formed respectively on insulating substrates 1a and 1b in the same manner as the above-presented embodiment, and are subjected to patterning. Further, on the ITO films 2a and 2b, an insulating film solution obtained by using A-2014 (trade name) available from Nissan Industrial Chemistry Co., Ltd. is applied by the spin coating method, and sintering is performed at 180° C. for 90 minutes, thereby forming insulating films 3a and 3b with a thickness of 1,200 Å.

Next, on the insulating films 3a and 3b, alignment films 4a and 4b are formed using the same material in the same manner as the described embodiment. However, for the resulting alignment films 4a and 4b, a rubbing treatment is performed at room temperature. Thereafter, by injecting the same ferroelectric liquid crystal material as the described embodiment, a ferroelectric liquid crystal element of comparative example 1 is prepared.

Table 1 shows results of measurement of the C2 ratio respectively obtained when the number of revolutions per minute N of the roller 12 is set to 500 rpm and 200 rpm when rubbing the alignment films 4a and 4b of the ferroelectric liquid crystal element of comparative example 1. For other conditions of the rubbing treatment, i.e., the diameter R of the roller 12, the moving speed V of the stage 10, the depth of the deformed region M of the rubbing cloth 11, and the number of repeated times n of rubbing are the same as those of the above-mentioned embodiment.

TABLE 1

| NUMBER OF REVOLUTIONS PER MINUTE N OF ROLLER | 500 rpm | 200 rpm |
| --- | --- | --- |
| C2 RATIO | 70% | 0% |

Additionally, the following correlation exists between the number of revolutions per minute of the roller and the rubbing strength. That is, the larger is the number of revolutions N, the larger is the rubbing strength. As is evident from Table 1, the larger is the number of revolutions per minute N of the roller 12, the higher is the C2 ratio, and the higher is the rubbing strength, the more desirable is the C2 orientation.

[Comparative Example 2]

Another ferroelectric liquid crystal element of comparative example 2 is prepared using a different liquid crystal material from a ferroelectric liquid crystal used in the ferroelectric liquid crystal element of comparative example 1. Here, the phase series of the liquid crystal material is: the isotropic phase-N* phase-SmA phase-SmC* phase. The respective phase transition temperatures are:

crystal→SmC* phase: at or below room temperature
SmC* phase→SmA phase: 78° C.
SmA phase N phase: 98° C.
N phase→isotropic phase: 114° C.

The respective C2 ratio obtained when performing the rubbing treatment with respect to the alignment film of the ferroelectric liquid crystal element of comparative example 2 by varying various conditions such as the depth of the deformed region M of the rubbing cloth 11, the moving speed V of the stage 10, the number of revolutions per minute N of the roller, and the repeated number of times n, etc., are shown in Table 2 through Table 5. In any of measurements, the rubbing treatment is performed at room temperature. In respective tables, a plurality of measured values shown in one cell indicate that the measurements are performed a plurality of times.

TABLE 2

| n [times] N [rpm] | 7 | 5 |
| --- | --- | --- |
| 700 | 10%, 0% | 10%, 0% |
| 500 | 0%, 0% | 20%, 0% |

M = 0.2 mm, and V = 10 mm/sec.

TABLE 3

| n [times] N [rpm] | 8 | 5 |
| --- | --- | --- |
| 500 | unmeasurable | 30% |
| 200 | 10% | 0% |

M = 0.2 mm, and V = 5 mm/sec.

TABLE 4

| n [times] N [rpm] | 7 | 5 | 3 |
| --- | --- | --- | --- |
| 700 | 50%, 50% | 20%, 10% | 0%, 0% |
| 500 | 50%, 20% | 20%, 10% | 0%, 0% |

M = 0.3 mm, and V = 10 mm/sec.

TABLE 5

| n [times] N [rpm] | 5 | 3 |
| --- | --- | --- |
| 700 | 90%, 50%, 70% | 70%, 10%, 0% |
| 500 | 98%, 50%, 50% | 90%, 10%, 0% |

M = 0.3 mm, and V = 5 mm/sec.

There exists the following correlation between each rubbing condition and the rubbing strength. Namely, the larger is the depth of deformed region M of the rubbing cloth 11 is, the larger is the rubbing strength. The lower is the moving speed V of the stage 10, the larger is the rubbing strength. The greater is the number of revolutions per minute N of the roller, the greater is the rubbing strength. Additionally, by increasing the repeated number of times n for the rubbing treatment, the rubbing strength can be increased.

From the respective results shown in Table 2 through Table 4, when performing the rubbing treatment at room temperature, a desirable C2 ratio cannot be obtained only by adjusting various conditions. Additionally, in Table 3, in the columns of the number of revolutions per minute N of the roller=500 rpm, and the number of repeated times of rubbing=8, results obtained under such condition that a relatively larger rubbing strength can be obtained are shown. However, the rubbing treatment results in scratches formed on the substrate, and the C2 ratio is not measurable.

In the rubbing conditions shown in Table 5, although a high C2 ratio is obtained, as there remain many scratches caused by the rubbing treatment when observed by the microscope, the rubbing conditions shown in Table 5 are not suited for practical applications.

It can be seen that the C2 ratio cannot be improved by lowering the rubbing strength in the known manner as is evident from Table 2 through Table 5.

As described, the manufacturing method of a smectic liquid crystal element of the present invention wherein a liquid crystal composition which shows a smectic phase is sealed between a pair of electrode substrates is characterized by including the step of applying a rubbing treatment to an alignment film formed on at least one of the pair of electrode substrates at temperature in a range of from 50° to 200° C.

According to the described manufacturing method, by applying the rubbing treatment at temperature in a range of from 50° to 200° C., generally, the alignment film formed by a polymer becomes softer. Thus, provided that conditions other than temperature are unchanged, the rubbing strength becomes higher compared with the case where the rubbing treatment is applied at room temperature. As described, by performing the rubbing treatment with a strong rubbing strength, an alignment film having an alignment control force for aligning the smectic liquid crystals to have C2 orientation can be achieved.

In the C2 orientation, the smectic layer of the liquid crystal composition is bent with respect to the phase normal line of the electrode substrate, and the bending direction of the smectic layer is in a rising direction of the liquid crystal molecules on an electrode substrate interface. In contrast, in the C1 orientation, the bending direction of the smectic layer is in an opposite direction to the rising direction of the liquid crystal molecules. Here, the C2 orientation has an advantageous characteristic of short response time over the C1 orientation.

The described characteristic permits a smectic liquid crystal element which offers a short response time and a desirable display state without defects to be achieved. This permits the C2 orientation to be achieved even when adopting the alignment film material in which only C1 orientation is shown when applying thereto the rubbing treatment at room temperature. This advantageous feature offers a wider selection for the materials of the alignment films. Furthermore, by applying the rubbing treatment under an applied heat, compared with the case of applying the rubbing treatment at room temperature, the alignment film is not likely to scratch, thereby achieving an improved yield.

It is preferable that the described manufacturing method be characterized in that the smectic liquid crystal composition has a smectic A phase and a smectic C phase in a phase series, the method further including the steps of:

moving a portion subjected to an application of pressure in a direction substantially parallel to a rubbing direction while locally applying a predetermined pressure to the smectic liquid crystals from outside of one of electrode substrates in a temperature range of from a phase transition temperature, at which a transition in phase occurs from the smectic A phase to the smectic C phase, to a temperature 10° C. below the phase transition temperature.

According to the described manufacturing method, in a temperature range of from a phase transition temperature, at which a transition in phase occurs from the smectic A phase to the smectic C phase, to a temperature 10° C. below the phase transition temperature, by moving the portion subjected to the application of pressure in a direction parallel to the rubbing direction while locally applying the pressure to the smectic liquid crystals, the portion having the C1 orientation can be realigned into the C2 orientation.

Namely, by carrying out the rubbing treatment at temperature in a range of from 50° to 200° C., an alignment state of the smectic liquid crystals can be approximated to a uniform C2 orientation on the entire surface; however, the C1 orientation may partially appear. Thus, by performing the realignment treatment in the described manner, the smectic liquid crystals may be arranged to have a uniform C2 orientation over the entire surface of the smectic liquid crystals. As a result, a smectic liquid crystal element having a short response time and a desirable display state without defects can be achieved.

Additionally, the smectic liquid crystal element in accordance with the present invention is arranged so as to include a pair of electrode substrates having an alignment film formed on at least one of the pair of substrates; and a liquid crystal composition having a smectic phase, the liquid crystal composition being sealed between the pair of substrates, wherein a rubbing treatment is applied to the alignment film at temperature in a range of from 50° to 200° C.

According to the described arrangement, by applying the rubbing treatment to the alignment film at temperature in a range of from 50° to 200° C., an alignment control force for aligning the smectic liquid crystals to have the C2 orientation can be achieved. This is because, in general, the alignment film formed by a polymer is softened at high temperature, and a larger rubbing strength can be achieved compared with that achieved when carrying out the rubbing treatment at room temperature even if other conditions than temperature are unchanged, thereby achieving a smectic liquid crystal which shows a desirable display without defects and a short response time.

It is preferable that the smectic liquid crystal element has the liquid crystal composition which shows ferroelectricity. According to the described arrangement, as the ferroelectric liquid crystals has a spontaneous polarization, a smectic liquid crystal element that can be driven at high speed can be achieved.

It is also preferable that the smectic liquid crystal element has a pre-tilt angle in a range of from 1° to 10°. If the pre-tilt angle is greater than 10°, the C1 orientation becomes more stable than the C2 orientation. On the other hand, if the pre-tilt angle is less than 1°, a difference in alignment between the C1 orientation and C2 orientation becomes small, and the mixed state of the C1 orientation and the C2 orientation is likely to occur. Thus, by setting the pre-tilt angle in a range of from 1° to 10°, a more stable C2 orientation can be obtained, thereby achieving a smectic liquid crystal element which shows a desirable display without defects and a short response time.

It is further preferable that the smectic liquid crystal element has a chevron structure in a smectic layer of a liquid crystal composition wherein the bending direction of the smectic layer is in the rising direction of liquid crystal molecules on an interface between the electrode substrates and the liquid crystal composition.

As described, a smectic liquid crystal element having a desirable display state without defects and a short response time can be achieved by aligning the smectic liquid crystals to have a uniform C2 orientation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A manufacturing method of a smectic liquid crystal element composed of a liquid crystal composition having a smectic C phase sealed between a pair of electrode substrates, comprising the steps of:

forming alignment films respectively on said pair of electrode substrates; and applying a rubbing treatment to at least one of said alignment films at temperature in the range from 50° to 200° C., wherein said liquid crystal composition is smectic liquid crystals having a smectic A phase and a smectic C phase in a phase series, said method further comprising the step of:

relatively moving a portion of the liquid crystal composition in a direction substantially parallel to a rubbing direction while locally applying a predetermined pressure to the smectic liquid crystals from outside of one of said electrode substrates in a 10° temperature range from a phase transition temperature at which a transition in phase occurs from the smectic A phase to the smectic C phase to a temperature 10° C. below the phase transition temperature.

2. The manufacturing method of a smectic liquid crystal element as set forth in claim 1, wherein:

when said liquid crystal composition shows ferroelectricity, said portion is relatively moved with respect to said electrode substrates in an opposite direction to the rubbing direction.

3. The manufacturing method of a smectic liquid crystal element as set forth in claim 1, wherein:

a pretilt angle is in the range of from about 1° to about 10°.

4. The manufacturing method of a smectic liquid crystal element as set forth in claim 1, wherein:

a pretilt angle is in the range of from about 3° to about 8°.

5. The manufacturing method of a smectic liquid crystal element as set forth in claim 1, wherein:

a smectic layer of said liquid crystal composition has a chevron structure, and a bending direction of said smectic layer is set to a rising direction of liquid crystal molecules on an interface between said electrode substrates and said liquid crystal composition.

6. A manufacturing method of a smectic liquid crystal element composed of a liquid crystal composition having a smectic C phase sealed between a pair of electrode substrates, comprising the steps of:

forming alignment films respectively on said pair of electrode substrates; and applying a rubbing treatment to at least one of said alignment films at temperature in the range from 60° to 100° C., wherein said liquid crystal composition is smectic liquid crystals having a smectic A phase and a smectic C phase in a phase series, said method further comprising the step of:

relatively moving a portion of the liquid crystal composition in a direction substantially parallel to a rubbing direction while locally applying a predetermined pressure to the smectic liquid crystals from outside of one of said electrode substrates in a 10° temperature range from a phase transition temperature at which a transition in phase occurs from the smectic A phase to the smectic C phase to a temperature 10° C. below the phase transition temperature.

7. A manufacturing method of a smectic liquid crystal element composed of a liquid crystal composition having a smectic phase sealed between a pair of electrode substrates, comprising the steps of:

(A) forming alignment films respectively on said pair of electrode substrates;

(B) applying a rubbing treatment to at least one of said alignment films at temperature in the range from 50° to 200° C.; and (C) realigning a C1 orientation into a C2 orientation after performing step (B), wherein said liquid crystal composition is smectic liquid crystals having a smectic A phase and a smectic C phase in a phase series, said method further comprising the step of:

relatively moving a portion of the liquid crystal composition in a direction substantially parallel to a rubbing direction while locally applying a predetermined pressure to the smectic liquid crystals from outside of one of said electrode substrates in a 10° temperature range from a phase transition temperature at which a transition in phase occurs from the smectic A phase to the smectic C phase to a temperature 10° C. below the phase transition temperature.

* * * * *